UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,062,913.  Specification of Letters Patent.  Patented May 27, 1913.

No Drawing.  Application filed March 20, 1911. Serial No. 615,663.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in Caoutchouc Substances and Processes of Making Same, of which the following is a specification.

By our earlier applications Ser. Nos. 578608, 594557 and 588173 the production of caoutchouc like substances is described, which may replace natural caoutchouc in its chemical and technical application. The processes for their production consist in converting into caoutchouc like substances methylerythrenes or their homologues in which at least 2 atoms of H are substituted by methyl groups, such as di-, tri,- or tetra-methylbutadiene.

It has now been found that by using mixtures of the starting materials mentioned in the above applications (erythrene and its substitution products) new caoutchouc-like substances can be advantageously produced, with properties different from those of the caoutchouc-like substances above referred to. Caoutchouc-like substances can be thus produced of a composite nature, made up of the polymerization products of the mixtures of erythrene hydrocarbons, and containing such products in most intimate intermixture. A more nearly homogeneous product and a more intimate intermixture can thus be produced by mixing the hydrocarbons before or during the polymerization reaction than is possible by mixing the individual and isolated caoutchoucs already formed.

In order to illustrate the new process more fully the following example is given, the parts being by weight:—A mixture of 100 parts of isoprene and 100 parts of beta-gamma-dimethylerythrene is heated for 3 months in an autoclave to 70–75° C. A very tough and elastic substance is thus obtained made up of the caoutchouc-like substance together with any remaining unchanged hydrocarbons and by-products. By treatment of this substance with steam such hydrocarbons and volatile by-products, if present, can be removed and the caoutchouc-like substance obtained. Mixtures of alpha-alpha-dimethylerythrene with beta-gamma-dimethylerythrene or of dimethylerythrenes with tri- and tetramethylerythrenes, etc., may be used. The process proceeds in an analogous manner on using agents promoting the polymerization *e. g.* acids or acid salts, etc. When such promoting agents are used, such as acetic acid, the time required for the completion of the process is appreciably shortened.

The new caoutchouc substances are white substances the color of which does not change. They swell up with chloroform or benzene to white hyaline substances from which the liquid can be poured off. They are free from protein substances, which are always contained in the natural caoutchouc and play an important part in it with regard to the elasticity of the natural caoutchouc. They form ozonids being thick oils, nitrosites and brom addition products. These ozonids, nitrosites and brom-addition products differ with the different composite caoutchouc products, and correspond to those different products, and thus indirectly to the particular mixtures of hydrocarbons of which the composite caoutchoucs are polymerization products. Thus the product produced as above described from a mixture of isoprene and beta-gamma-dimethylerythrene forms an ozonid, or mixture of ozonids, which upon decomposition with water yields a mixture of oxygen-containing decomposition products among which levulinic aldehyde (methyl-succinic aldehyde) and acetonyl acetone (dimethyl succinic aldehyde) are found. Similarly other mixtures of the products from mono- and polymethyl erythrenes form ozonids which give mixtures of mono- and poly-methyl derivatives of succinic aldehyde upon decomposition.

We claim:—

1. The process of producing a caoutchouc-like substance which comprises polymerizing a mixture of substituted erythrene hydrocarbons.

2. The process of producing a caoutchouc-like substance which comprises polymerizing a mixture of methyl-substituted erythrene hydrocarbons.

3. The process of producing a caoutchouc-like substance which comprises polymerizing a mixture of mono- and poly-methyl erythrene hydrocarbons.

4. The process of producing a caoutchouc-like substance which comprises polymerizing a mixture of mono- and dimethyl erythrene hydrocarbons.

5. The process of producing a caoutchouc-like substance which comprises polymerizing a mixture of erythrene hydrocarbons including isoprene and a polymethyl erythrene.

6. The process of producing a caoutchouc-like substance which comprises polymerizing a mixture of erythrene hydrocarbons including isoprene and diisopropenyl.

7. The process of producing a caoutchouc-like substance which comprises polymerizing a mixture of erythrene hydrocarbons including diisopropenyl.

8. The process of producing a caoutchouc-like substance which comprises polymerizing a mixture of erythrene hydrocarbons including diisopropenyl and a substituted erythrene.

9. The process of producing a caoutchouc-like substance which comprises polymerizing a mixture of erythrene hydrocarbons including diisopropenyl and a mono-methyl erythrene.

10. The process of producing a caoutchouc-like substance which comprises heating a mixture of substituted erythrene hydrocarbons under caoutchouc-forming conditions until a product results insoluble in acetone.

11. The process of producing a caoutchouc-like substance which comprises heating a mixture of methyl-substituted erythrene hydrocarbons under caoutchouc-forming conditions until a product results insoluble in acetone.

12. The process of producing a caoutchouc-like substance which comprises heating a mixture of mono- and poly-methyl erythrene hydrocarbons under caoutchouc-forming conditions until a product results insoluble in acetone.

13. The process of producing a caoutchouc-like substance which comprises heating a mixture of mono- and dimethyl erythrene hydrocarbons under caoutchouc-forming conditions until a product results insoluble in acetone.

14. The process of producing a caoutchouc-like substance which comprises heating a mixture of erythrene hydrocarbons including isoprene and a poly-methyl erythrene under caoutchouc-forming conditions until a product results insoluble in acetone.

15. The process of producing a caoutchouc-like substance which comprises heating a mixture of erythrene hydrocarbons including isoprene and diisopropenyl under caoutchouc-forming conditions until a product results insoluble in acetone.

16. The process of producing a caoutchouc-like substance which comprises heating a mixture of erythrene hydrocarbons including diisopropenyl under caoutchouc-forming conditions until a product results insoluble in acetone.

17. The process of producing a caoutchouc-like substance which comprises heating a mixture of erythrene hydrocarbons including diisopropenyl and a substituted erythrene under caoutchouc-forming conditions until a product results insoluble in acetone.

18. The process of producing a caoutchouc-like substance which comprises heating a mixture of erythrene hydrocarbons including diisopropenyl and a mono-methyl erythrene under caoutchouc-forming conditions until a product results insoluble in acetone.

19. The process of producing a caoutchouc-like substance which comprises heating in the presence of an agent promoting polymerization a mixture of substituted erythrene hydrocarbons under caoutchouc-forming conditions until a product results insoluble in acetone.

20. The process of producing a caoutchouc-like substance which comprises heating in the presence of an agent promoting polymerization a mixture of methyl-substituted erythrene hydrocarbons under caoutchouc-forming conditions until a product results insoluble in acetone.

21. The process of producing a caoutchouc-like substance which comprises heating in the presence of an agent promoting polymerization a mixture of mono- and poly-methyl erythrene hydrocarbons under caoutchouc-forming conditions until a product results insoluble in acetone.

22. The process of producing a caoutchouc-like substance which comprises heating in the presence of an agent promoting polymerization a mixture of mono- and dimethyl erythrene hydrocarbons under caoutchouc-forming conditions until a product results insoluble in acetone.

23. The process of producing a caoutchouc-like substance which comprises heating in the presence of an agent promoting polymerization a mixture of erythrene hydrocarbons including isoprene and a polymethyl erythrene under caoutchouc-forming conditions until a product results insoluble in acetone.

24. The process of producing a caoutchouc-like substance which comprises heating in the presence of an agent promoting polymerization a mixture of erythrene hydrocarbons including isoprene and diisopropenyl under caoutchouc-forming conditions until a product results insoluble in acetone.

25. The process of producing a caoutchouc-like substance which comprises heating in the presence of an agent promoting polymerization a mixture of erythrene hydrocarbons including diisopropenyl under caoutchouc-forming conditions until a product results insoluble in acetone.

26. The process of producing a caoutchouc-like substance which comprises heating in the presence of an agent promoting polymerization a mixture of erythrene hydrocarbons including diisopropenyl and a substituted erythrene under caoutchouc-forming conditions until a product results insoluble in acetone.

27. The process of producing a caoutchouc-like substance which comprises heating in the presence of an agent promoting polymerization a mixture of erythrene hydrocarbons including diisopropenyl and a mono-methyl erythrene under caoutchouc-forming conditions until a product results insoluble in acetone.

28. As a new product a caoutchouc-like substance comprising the caoutchouc-like polymerization product of a mixture of substituted erythrene hydrocarbons.

29. As a new product a caoutchouc-like substance comprising the caoutchouc-like polymerization product of a mixture of methyl-substituted erythrene hydrocarbons, which product forms a nitrosite, ozonid and brom-addition product, the ozonid upon decomposition with water yielding a plurality of oxygen-containing decomposition products including a plurality of methyl-substituted derivatives of succinic aldehyde.

30. As a new product a caoutchouc-like substance comprising the caoutchouc-like polymerization product of a mixture of mono- and dimethyl erythrene hydrocarbons, which product forms a nitrosite, ozonid and brom-addition product, the ozonid upon decomposition with water yielding a plurality of oxygen containing decomposition products including mono- and dimethyl substitute derivatives of succinic aldehyde.

31. As a new product a caoutchouc-like substance comprising the caoutchouc-like polymerization product of a mixture of mono- and poly-methyl erythrene hydrocarbons, which product forms a nitrosite, ozonid and brom-addition product, the ozonid upon decomposition with water yielding a plurality of oxygen-containing decomposition products including mono- and polymethyl substituted derivatives of succinic aldehyde.

32. As a new product a caoutchouc-like substance comprising the caoutchouc-like polymerization product of a mixture of erythrene hydrocarbons including isoprene and a poly-methyl erythrene, which product forms a nitrosite, ozonid and brom-addition product, the ozonid upon decomposition with water yielding a plurality of oxygen containing decomposition products including levulinic aldehyde and polymethyl derivative of succinic aldehyde.

33. As a new product a caoutchouc-like substance comprising the caoutchouc-like polymerization product of a mixture of erythrene hydrocarbons including isoprene and diisopropenyl, which product forms a nitrosite, ozonid and brom-addition product, the ozonid upon decomposition with water yielding a plurality of oxygen-containing decomposition products including levulinic aldehyde and acetonyl acetone.

34. As a new product a caoutchouc-like substance comprising the caoutchouc-like polymerization product of a mixture of erythrene hydrocarbons including diisopropenyl, which product forms a nitrosite, ozonid and brom-addition product, the ozonid upon decomposition with water yielding a plurality of oxygen-containing decomposition products including acetonyl acetone.

35. As a new product a caoutchouc-like substance comprising the caoutchouc-like polymerization product of a mixture of erythrene hydrocarbons including diisopropenyl and a substituted erythrene, which product forms a nitrosite, ozonid and brom-addition product, the ozonid upon decomposition with water yielding a plurality of oxygen-containing decomposition products including acetonyl acetone and a substituted derivative of succinic aldehyde.

36. As a new product a caoutchouc-like substance comprising the caoutchouc-like polymerization product of a mixture of erythrene hydrocarbons including diisopropenyl and a mono-methyl erythrene, which product forms a nitrosite, ozonid and brom-addition product, the ozonid upon decomposition with water yielding a plurality of oxygen-containing decomposition products, including acetonyl-acetone and a mono-methyl substituted derivative of succinic aldehyde.

37. As a new product a caoutchouc-like substance comprising the caoutchouc-like polymerization product of a mixture of erythrene hydrocarbons, in which product the ratio of carbon to hydrogen is less than in isoprene caoutchouc.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
ALFRED HENKEL,
A. POSEN.